Aug. 23, 1960     K. A. KLINGLER     2,949,787
EXTENSION SEAL
Filed Sept. 12, 1957
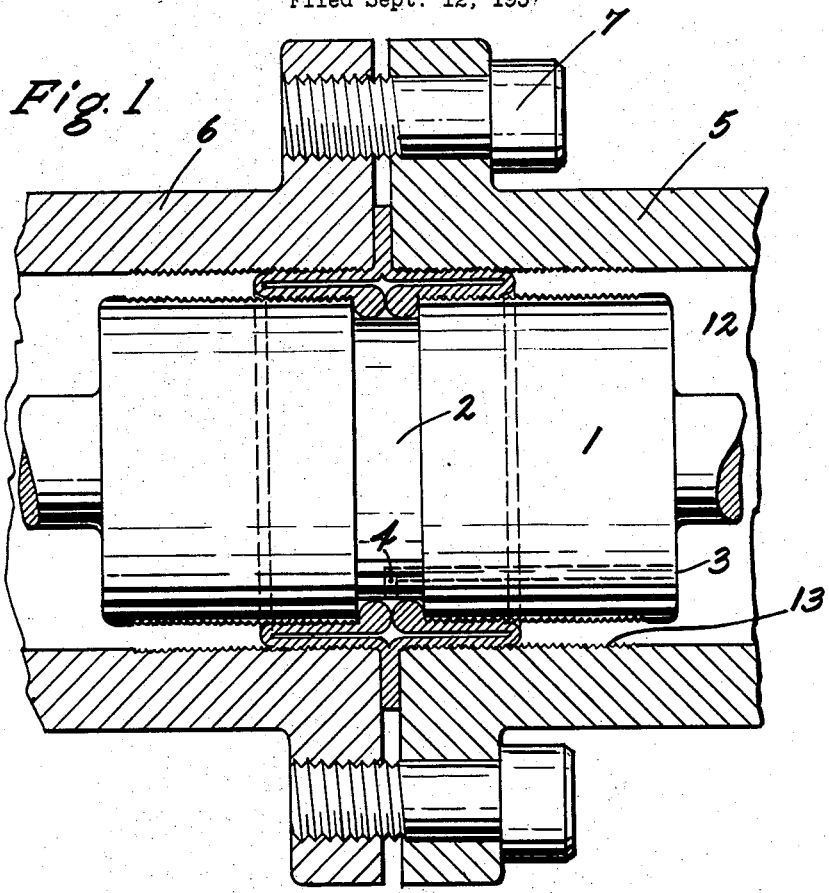
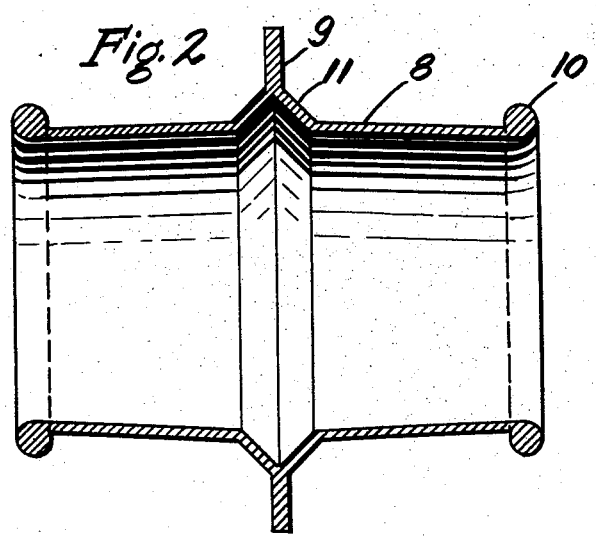
Inventor
Karl A Klingler
by Parker & Carter
Attorneys

United States Patent Office 2,949,787
Patented Aug. 23, 1960

2,949,787

EXTENSION SEAL

Karl A. Klingler, 111 S. Wright St., Naperville, Ill.

Filed Sept. 12, 1957, Serial No. 683,658

5 Claims. (Cl. 74—18.2)

My invention relates to extension seals to provide a flexible fluid-tight seal for reciprocating elements such as plungers, pistons and piston rods.

One object is to provide a seal which will give fluid tightness without appreciable frictional resistance and reduce wear of the seal.

Another object is to provide a seal which will support substantial variations in pressure without distortion.

Another object is to provide a seal which is cheap, easy and convenient to install and of long life.

In general, I propose to provide a seal which comprises an elastomeric sleeve which can encircle the reciprocating element, fill the annular space between the reciprocating element and the cylindrical housing in which it is socketed, which will be sealed by the pressure from the high side and in which the heavier the pressure the more effective the seal.

Other objects will appear from time to time throughout the specification and claims.

My invention is illustrated more or less diagrammatically in the accompanying drawings, wherein—

Figure 1 is a longitudinal section through a cylinder and extension seal showing the plunger in elevation;

Figure 2 is a longitudinal section through the sealing sleeve before assembly.

Like parts are indicated by like characters throughout the specification and drawings.

1 is a pump piston or plunger, 2 an annular groove intermediate the ends thereof. 3 is a duct extending from the high side longitudinally of the piston to communicate with a radial duct 4 open in the bottom wall of the groove 2. 5, 6 indicate a two part cylindrical housing encircling the plunger, being flanged as indicated, the two parts being held together by cap screws 7.

An elastomeric sleeve 8 is exteriorly flanged intermediate its ends as at 9 and terminating at each end in a seal ring 10 outwardly extending from the sleeve and similar in contour to the well known O-ring seal. The inner diameter of the sleeve increases from the ends toward the center gradually and adjacent the flange 9 is conically increased and tapered as at 11.

In assembly, the sleeve is interiorly telescoped about the plunger 1 so that the two rings 10 penetrate and seat in the annular groove 2, immediately inside of the portion of the sleeve of maximum diameter. The flange anchorage 9 is gripped between the flanged ends of the housing and the cap screws are tightened up. Then when pressure is applied on the high pressure side of the system at 12, the fluid enters into the groove 2, passes between the opposed rings 10 into the space inside the sleeve, inflating the sleeve and holding it radially against the plunger and the cylindrical housing. The higher the pressure on the high side, the greater the pressure of the sleeve against the opposite sides of the annulus in which it is contained and so the tighter the seal.

If desired, the surfaces may be smooth. On the other hand, if the surfaces are roughened as at 13 the sleeve may penetrate or interlock with the roughness of the surfaces and so be held in position. As the plunger moves back and forth, the rings 10 go with it and the sleeve pays out or withdraws as the case may be, rolling onto and off of the opposed walls of the annulus.

I claim:

1. In combination, a two-part cylinder, the two parts being concentric and in alignment and means for holding them together, a plunger adapted to reciprocate in the cylinder, an annular groove in the face of the plunger, packing means comprising an elastomeric sleeve having a central outwardly extending flange compressed between the abutting cylinder ends and terminating at each end in seal rings, the two seal rings being socketed in the annular groove in the plunger and held in contact with one another so as to form a sleeve interior, means for forcing fluid between the opposed seal rings into the interior of the sleeve.

2. In combination, a two-part cylinder, the two parts being concentric and in alignment and means for holding them together, a plunger adapted to reciprocate in the cylinder, an annular groove in the circumference of the plunger, packing means comprising an elastomeric sleeve having a central outwardly extending flange compressed between the abutting cylinder ends and terminating at each end in seal rings, the two seal rings being socketed in the annular groove in the plunger and held in contact with one another so as to form a sleeve interior, means for forcing fluid between the opposed seal rings into the interior of the sleeve, said means comprising a channel through the plunger, open at one end thereof and a radial branch leading therefrom to the space within the annular groove in register with the zone of contact of the two seal rings.

3. A seal comprising a one piece elastomeric sleeve, open at both ends, decreasing in diameter from the center toward both ends, a seal ring integral with and bounding each end of the sleeve, a solid one piece anchorage flange integral with and generally perpendicular to the axis of the sleeve, extending radially outwardly from the outer periphery thereof adjacent the center thereof.

4. A seal comprising a one piece elastomeric sleeve, open at both ends, decreasing in diameter from the center toward both ends, a seal ring integral with and bounding each end of the sleeve, a solid one piece anchorage flange integral with and generally perpendicular to the axis of the sleeve, extending radially outwardly from the outer periphery thereof adjacent the center thereof, an annular pocket disposed in the inner periphery of the sleeve in register with and extending outwardly on both sides of the anchorage flange.

5. In combination, a two part cylinder, the two parts being concentric and in alignment, means for holding them together, a plunger adapted to reciprocate in the cylinder, an annular groove in the outer periphery of the plunger, packing means comprising a one piece elastomeric sleeve having a central outwardly extending slotted one piece anchorage flange compressed between the abutting cylinder ends, the sleeve terminating at each end in seal rings, the seal rings being socketed in the annular groove in the plunger in snug contact with one another.

References Cited in the file of this patent

UNITED STATES PATENTS

| | | |
|---|---|---|
| 714,243 | Sargent | Nov. 25, 1902 |
| 1,876,455 | Inshaw | Sept. 6, 1932 |
| 2,145,189 | Nathan | Jan. 24, 1939 |
| 2,148,101 | Brucker | Feb. 21, 1939 |
| 2,757,542 | Klingler | Aug. 7, 1956 |
| 2,864,258 | Klingler | Dec. 16, 1958 |

FOREIGN PATENTS

| | | |
|---|---|---|
| 324,518 | France | Apr. 3, 1903 |